United States Patent
Reike et al.

(10) Patent No.: US 8,612,548 B2
(45) Date of Patent: Dec. 17, 2013

(54) COMPUTER SERVER SYSTEM AND COMPUTER SERVER FOR A COMPUTER SERVER SYSTEM

(75) Inventors: Reiner Reike, Althengstett (DE); Dieter Staiger, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 12/107,276

(22) Filed: Apr. 22, 2008

(65) Prior Publication Data
US 2009/0006685 A1 Jan. 1, 2009

(30) Foreign Application Priority Data
Jun. 28, 2007 (EP) .................................. 07111324

(51) Int. Cl.
*G06F 15/16* (2006.01)
*G06F 13/00* (2006.01)
*G06F 9/44* (2006.01)

(52) U.S. Cl.
USPC ........... 709/219; 709/203; 709/229; 710/104; 703/21

(58) Field of Classification Search
USPC ................................ 709/203, 219, 229; 710/1
See application file for complete search history.

(56) References Cited

U.S. PATENT DOCUMENTS

| | | | |
|---|---|---|---|
| 2002/0001307 A1* | 1/2002 | Nguyen et al. | 370/386 |
| 2002/0116485 A1* | 8/2002 | Black et al. | 709/223 |
| 2002/0143996 A1* | 10/2002 | Odryna et al. | 709/246 |
| 2003/0048614 A1* | 3/2003 | Garnett et al. | 361/724 |
| 2004/0054780 A1* | 3/2004 | Romero | 709/226 |

* cited by examiner

*Primary Examiner* — Ranodhi Serrao
(74) *Attorney, Agent, or Firm* — Fleit Gibbons Gutman Bongini & Bianco PL; Thomas Grzesik (57) ABSTRACT

A computer server system comprises multiple computer server units, each computer server comprising a server processing system. Each computer server comprises a local subsystem access module which is standardized for the multiple computer servers and which provides virtual control function for a single instantiation of a hardware resource of the computer server system, wherein the hardware resource is shared between each of the computer servers.

20 Claims, 7 Drawing Sheets

COMPUTER SERVER SYSTEM AND COMPUTER SERVER FOR A COMPUTER SERVER SYSTEM

FIELD OF THE INVENTION

The invention relates to a computer server system and a computer server for a computer server system according to the preambles of the independent claims.

BACKGROUND OF THE INVENTION

Computer server systems are known in the art. Typically, computer server systems exhibit multiple computer servers mounted in a standard chassis. Such computer servers are available as rack-mounted servers or as so called Blades.

In a standard rack configuration, one rack unit (1 U) is the minimum possible size of any equipment. A component mounted in the rack can be of the size of one (1 U), two (2 U) or n rack units (nU). A rack unit is a unit of measure used to describe the height of a device mounted in a 19-inch or a 23-inch rack, wherein 19 inch and 23 inch refer to the width of the rack. One rack unit is 1.75 inch high. The most common computer rack form factor is 42 U high, which limits the number of discrete rack-mounted servers directly mounted. Blade units are not restricted to this number. The form factors of Blades are typically smaller than those of rack-mounted servers. Today 70 computers per rack and more are achievable with today's Blade generations.

Blade servers are high-density, self-contained computer servers. Blade servers have all functional components to be considered a computer, such as memory to read input commands and data, a processor to perform commands manipulating that data and memory to store the results. A Blade enclosure usually provides services such as power, cooling, networking, various interconnects and management, thus performing many of the non-core computing services found in most computers. Usually, for accessing the individual Blades, a display, a keyboard and a mouse can be attached to a specific Blade.

Besides the basic computer functions, the computer servers provide specific support functions like i.e. graphics controller or keyboard and mouse control. These functions are implemented as electrical components requiring electrical power and resulting in heat generation. Considering the maximum allowable thermal load to electronic components and reliable cooling capacities, the heat generation per Blade or per rack-mounted server is restricted to a few hundred Watt only.

In view of the foregoing, there is a need for an improved computer server and an improved computer server system where a higher density is possible. In addition, the overall energy consumption of computer systems is becoming more and more important, energy consumption reductions and optimization is a requirement for new systems in development.

SUMMARY OF THE INVENTION

It is an object of the invention to provide an improved computer server system and an improved computer server with increased reliability.

According to a first aspect of the invention, a computer server system comprising multiple computer servers, each computer server comprising a server processing system. In each computer server unit a local subsystem access module is provided which is standardized for the multiple servers and which provides virtual control function for a single instantiation of a hardware resource of the computer server system, wherein the hardware resource is shared between each of the computer servers.

Prior art multiple instantiation of I/O (Input/Output) hardware such as graphic controllers and associated support electronics are provided by each individual computer server of a server complex. Prior art systems usually provide extended graphics capabilities like 2D/3D-support functions which are on-hand by using today's graphics chips. In a preferred embodiment, I/O-intelligence such as "graphic controller intelligence" can be shifted to a separate board in the system thus simplifying the individual processor boards. In an embodiment without graphic requirements, e.g. such as web hosts, the local subsystem access module simply can simulate a graphic controller function for satisfying a requirement during booting the system. In an embodiment encompassing servers with remote administration, where remote I/O functions such as video, keyboard and mouse are provided via a network, the local subsystem access module provides a means to feed a data stream required by the remote I/O function to the server network controller. A specific protocol is used to transport the remote administration data stream in-band. The data volume to be transported can be reduced to a reasonable volume.

In power constrained systems like Blades, which usually have narrow power-consumption boundaries, the power consumption can be reduced and an increased reserved energy potential to the main processing system electronics can be provided. Thus the system efficiency can be increased and overall power subsystem requirements can be reduced. Overall system manufacturing cost can be reduced, e.g. by reduction of the system planar real-estate requirement. Common resource subsystems for all and particularly varying processor boards can provide a simplified usability for users.

Favorably, the local subsystem access module can comprise display control functions and specific subsystem-access ports. It is not necessary to provide a graphics controller on each computer server. The system reliability can be increased due to the reduced component and interconnect count. Fault-prone analog signal intercommunication on the board can be avoided.

Advantageously, the local subsystem access module can comprise a sequencer engine to which a system bus adapter controller, a configuration storage and a register file are coupled. As an option, a serializer/deserializer unit can be coupled to the sequencer engine. Preferably, such a serializer/deserializer unit can be a pair of functional blocks commonly used in high speed communications in order to convert data between serial data and parallel interfaces in each direction.

Favorably, the sequencer engine can be a register-file programmable sequencer. If the local subsystem access module can comprise a frame-buffer memory, the module becomes very simple.

The local subsystem access module can be integrated in a field programmable gate array yielding a compact and simple implementation of the module in the processor board of the computer server.

According to a preferred embodiment, a receptor device can be provided which is common for all local subsystem access modules. The individual complex support electronics located "duplicative" on the processor board of each computer server can be moved to a common location physically closed to where the respective function is required, e.g. a backplane or typical for Blade system implementations a midplane or a management module in a Blade center. Advantageously, the preferred computer server system has a simplified overall system, a reduced number of elements, a reduced complexity. Particular advantages are that the physical board space requirement is reduced and that board space can be gained for advantageous system expansion functions.

The receptor device can be coupled to the local subsystem access module of each computer server unit via a multiplexer.

The receptor device can be coupled to a single graphics controller subsystem common to all computer servers.

In a favorable embodiment, the receptor device, the multiplexer and the graphics controller subsystem can be integrated on a common board, e.g. a backplane of a Blade system. As only one common display controller is required in the computer server system only one graphic controller type needs to be supported by software, e.g. Blade comprehensive. Consequently, system software can be simplified. Additionally, the backplane can be simplified due to a simpler signal multiplexer.

According to a second aspect of the invention, a computer server unit suggested which is designated for use in a computer server system comprising multiple computer server units particularly according to one of the preceding claims, comprising a server processing system. A standardized local subsystem access module provides virtual control function for a single instantiation of a hardware resource (310) of the computer server system, wherein the hardware resource is shared between each of the computer servers (10, 10A, 10B).

The local subsystem access module can comprise display control functions and specific subsystem-access ports.

Favorably, the local subsystem access module can comprise a sequencer engine to which a system bus adapter controller, a configuration storage and a register file are coupled.

A serializer/deserializer unit is coupled to the sequencer engine. This is favorable if the module serves as a dispatcher and a receptor device is provided in a separate board, e.g. a midplane of a Blade center.

The sequencer engine can advantageously be a register-file programmable sequencer.

Favorably the local subsystem access module comprises a frame-buffer memory.

In a preferred embodiment, the local subsystem access module can be integrated in a field programmable gate array.

Advantageously the invention exploits a computer server system and a computer server which allow for a simplification of the computer server system clearing real-estate on the processor board which can be used for additional system functions in par with reduced power consumption in the system.

BRIEF DESCRIPTION OF THE DRAWINGS

The present invention together with the above-mentioned and other objects and advantages may best be understood from the following detailed description of the embodiments, but not restricted to the embodiments, in conjunction with the accompanying drawings which show.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF THE INVENTION

Generally, the present invention provides an improved computer server system and an improved computer server with increased reliability and reduced power consumption. Individual I/O-controllers and subsystem access electronics are replaced by a single local subsystem access module on each processor board (computer server) of a multi-server system. The individual complex support electronics can be moved to a common location physically close to where the respective function is required. The local subsystem access module is representing a "virtual multi-controller" in a single instantiation reacting on all required sub-system functions.

Figure 1:
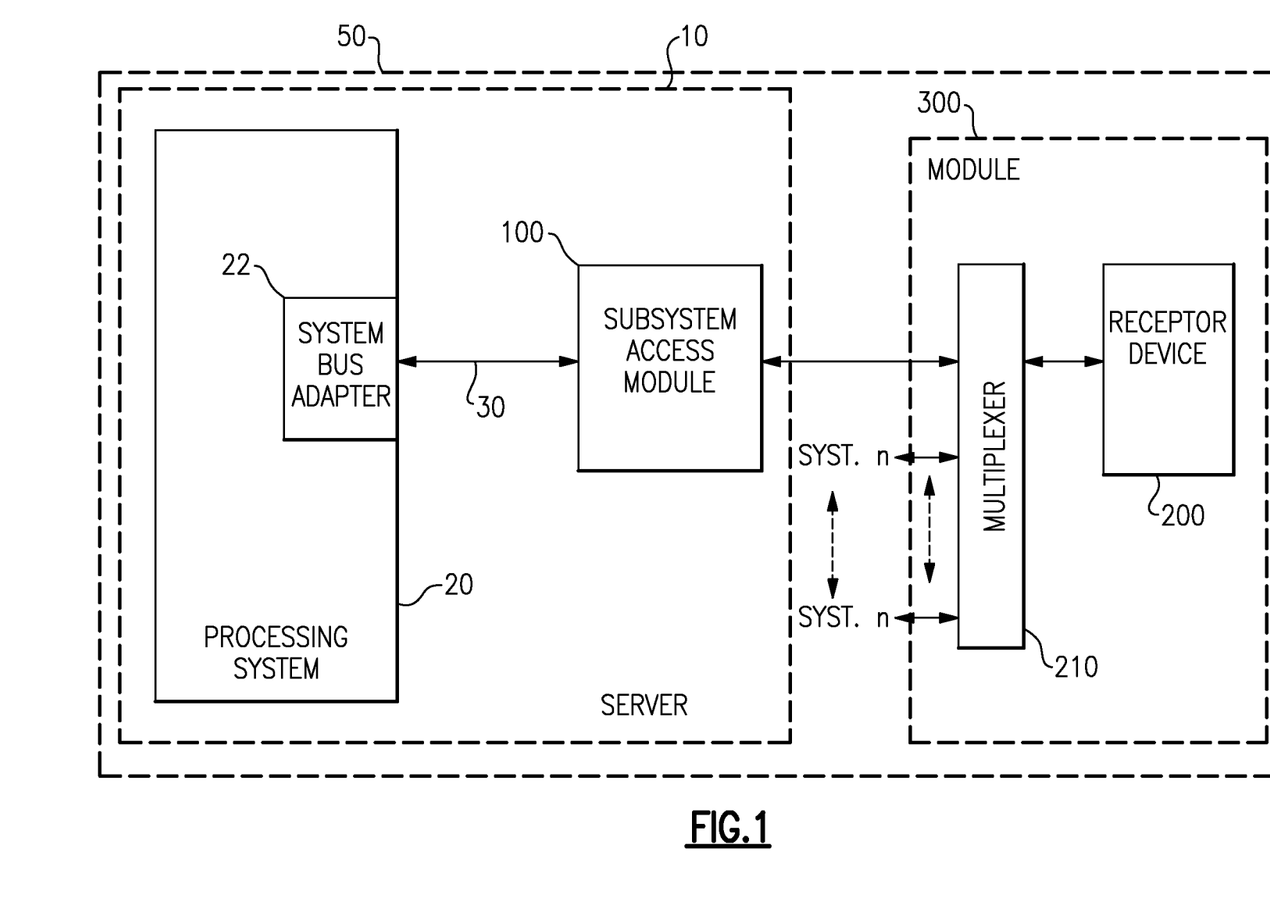
FIG. 1 depicts a first preferred embodiment comprising a local subsystem access module on a first processor board and a common receptor device on a separate board.

FIG. 1 depicts schematically a preferred embodiment of a computer server system 50 comprising multiple computer servers. Such a computer server system 50 may be a system with multiple Blades in a Blade enclosure or with multiple rack-mounted servers. Only one computer server 10 is shown which coupled to a module 300, e.g. a board like a backplane in a Blade system or the like. The module 300 may be arranged on a dedicated support card or on a management module card providing management support for the computer server system 50.

Particularly, the computer server 10 is coupled to a multiplexer 210 which also provides coupling of other, not depicted computer servers of the system 50, which is denoted by "syst.n" at the local-subsystem-access-module side of the multiplexer 210. The multiplexer 210 selectively couples ingoing signals to a receptor device 200, which is described in more detail in FIG. 7.

Each computer server 10 comprises a server processing system 20 comprising a system bus adapter 22 which is coupled to a preferred local subsystem access module 100 within the computer server 10, i.e. on the processor board of the computer server 10, via a bus 30. As known in the art, the processing system 20 may typically comprise a memory (not shown) to read input commands and data, a processor (not shown) to perform commands manipulating that data and a memory (not shown) to store results. The bus 30 may be a PCI (Peripheral Component Interface), PICx (PCI extended), PCIe (PCI-Express) bus or the like. The local subsystem access module 100 sends signals through a bus and the multiplexer 210 to the receptor device 200 which retransforms the bus data to provide them to a single graphics controller (not shown) connected to the receptor device 200.

In this embodiment, I/O-functions are provided and needed for only one server 10 at a time. This usually happens if a user connects to the server enclosure in order to access a particular server 10, thus requiring graphics as well as keyboard and mouse functionalities. The conventional graphics controller including the associated support electronics usually provided by each server 10 is replaced by the local subsystem access module 100 and the receptor device 200. The display controllers and preferably all specific subsystem-access ports (typically represented by dedicated controllers, i.e. USB (Universal Serial Bus), UART (Universal Asynchronous Receiver Transmitter), etc. used e.g. for mass storage device access like CD (Compact Disc), DVD (Digital Versatile Disc); or i.e. keyboard and mouse access; or for graphic display access) which conventionally are available on each computer server 10 can be replaced by the local subsystem access module 100. The "real" functions are shifted to the receptor device 200 which is arranged in a common place, such as a system management card or a separate support function card, as elucidated above. The implementation of the local subsystem access module 100/receptor device 200 for other multi-server systems besides Blade server systems (racks or frames) are analogous to the implementation described for the Blade system.

Figure 2:
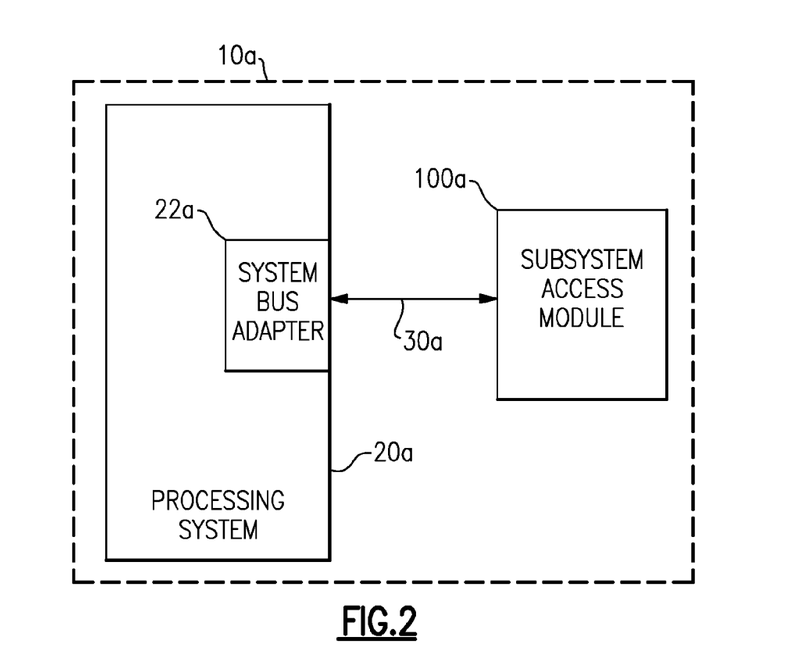
FIG. 2 depicts a preferred computer server without graphic requirement.

In cases such as described in FIG. 2, where no graphics functionality is required, e.g. when the computer server system is a webhost system, there is no need for a receptor device as described in FIG. 1. Although no graphics requirement exists, a conventional computer server would nevertheless provide a graphics controller as conventional operating systems (for example Windows®) will not boot without a graphics controller. Once the system is booted the entire graphics electronics is not required and used at any time throughout the normal system operation. In the preferred embodiment depicted in FIG. 2 the local subsystem access module 100a in a computer sever 10a simulates a graphic controller. The computer server 10a comprises a server processing system 20a with a system bus adapter 22a which is coupled to the local subsystem access module 100a by a bus 30a. The 30a bus is a simple serial bus such as PCI, PCIx, PCIe or the like instead of a parallel bus which usually goes with a graphics controller in conventional server computers.

Figure 3:
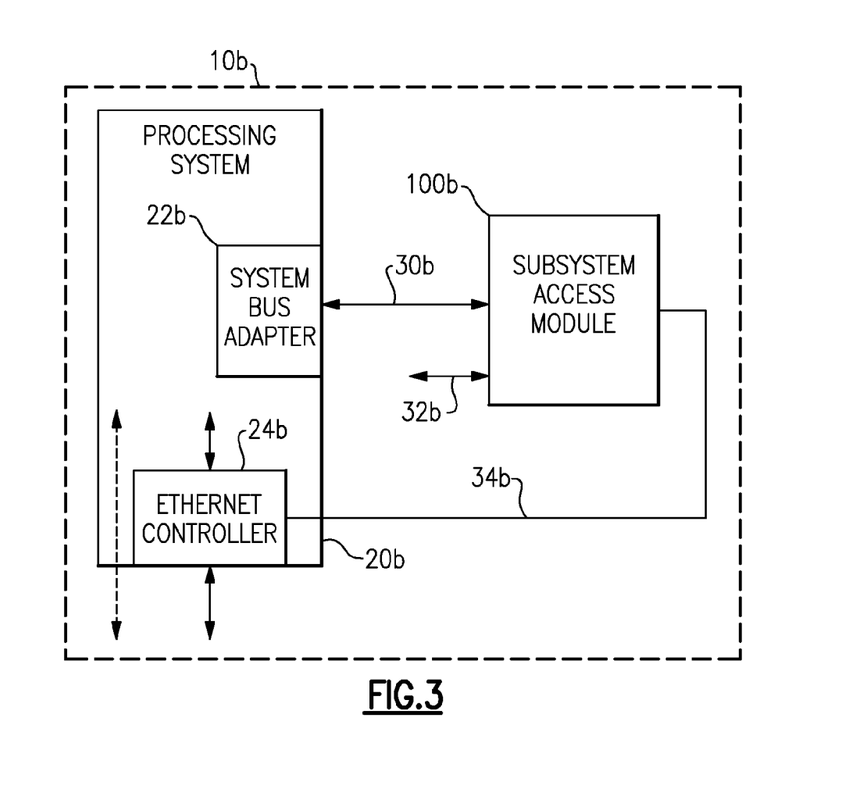
FIG. 3 depicts a preferred embodiment in a network with remote administration.

As a further preferred embodiment, FIG. 3 depicts a computer server system supporting remote administration. Advanced computer servers 10b provide remote video, keyboard and mouse functions via network, thus allowing remote workstations to access and control the computer server 10b. As conventional graphics controllers implemented on conventional computer servers provide extended graphics capabilities like 2D/3D (two-dimensional, three-dimensional) support, data streams with very high volumes are available but not required. The local subsystem access module 100b provides a serial bus with a low data volume sufficient for the application. The server computer 10b comprises a server processing system 20b with a system bus adapter 22b which is connected to the local subsystem access module 100b by a bus 30b, such as PCI, PCIx, PCIe or the like. For remote control the local subsystem access module 100b provides a bus 34b between the local subsystem access module 100b and an Ethernet controller 24b for Ethernet access, e.g. with TCP/IP (Transmission Control Protocol/Internet Protocol) standard. Data (video information) sent by module 22b is compressed and packed by module 100b and put on bus 34b for in-band transmission.

Additionally, the local subsystem access module 100b may serve as a virtual keyboard and/or mouse. In this case, the keyboard/mouse data received by controller 24b (via the network) is forwarded by bus 34b to the local subsystem access module 100b. Local subsystem access module 100b unpacks the data and outputs the data to the respective port (mouse or keyboard), indicated by a bidirectional arrow of line 32. Generally, for video the information is directed from the server to a "remote" screen. For keyboard/mouse the main information direction is reversely directed from a "remote" keyboard and/or mouse to the server.

Figure 4A:
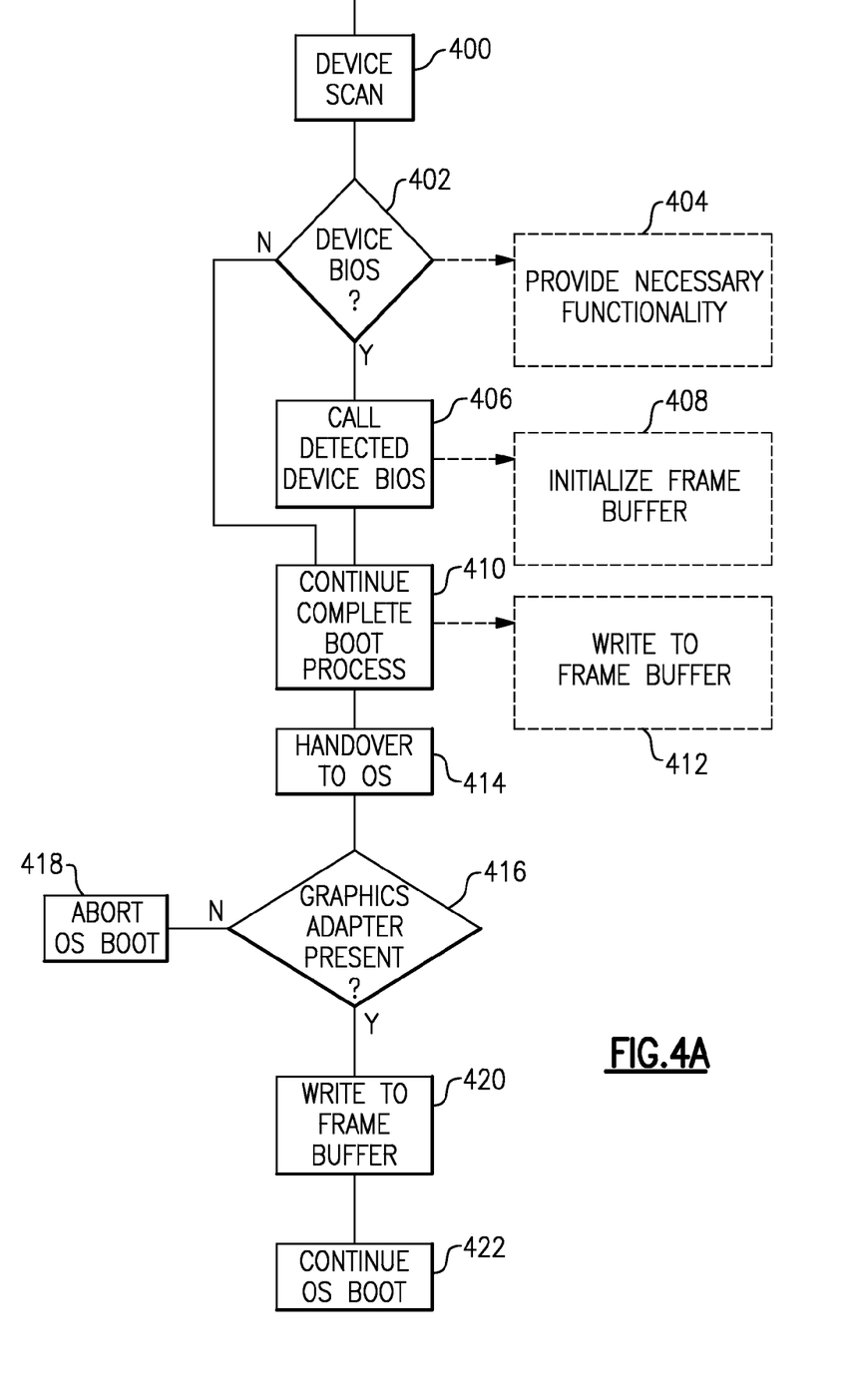
FIG. 4A depicts a flow diagram of a first boot process on a pc.
Figure 4B:
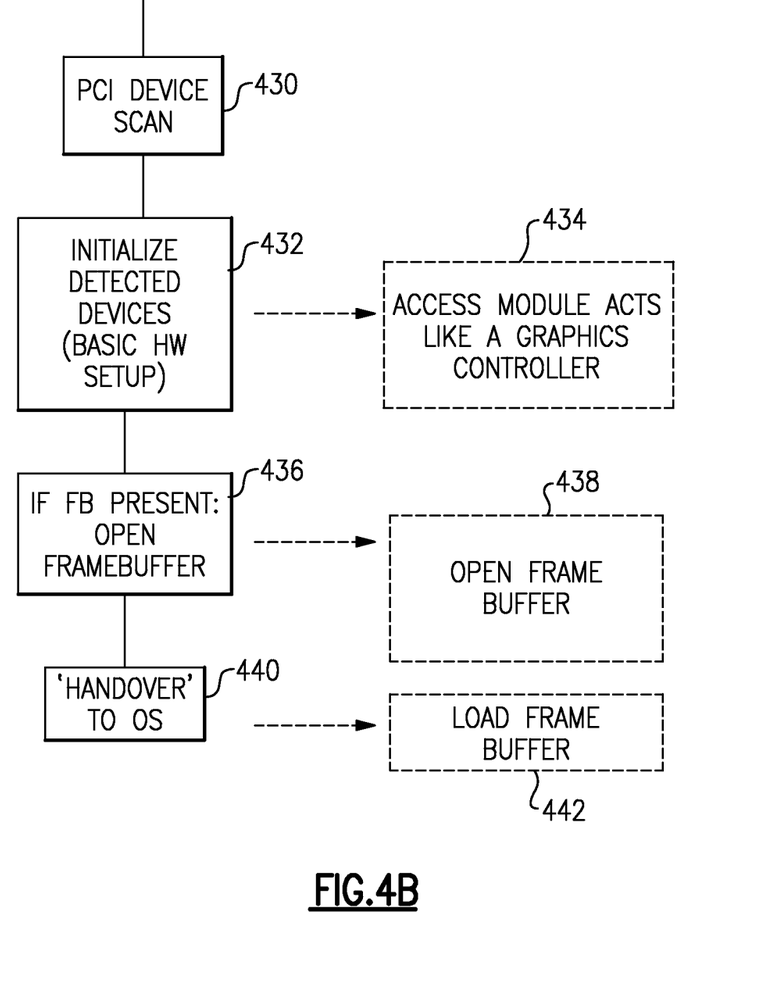
FIG. 4B depicts a flow diagram of a second boot process on a non-pc hardware.

Flow charts for boot sequences are shown in FIG. 4A for a Windows® operating system on a PC (Personal Computer) hardware and FIG. 4B for a Linux operating system running on a non-PC hardware.

Starting in FIG. 4A with a BIOS (Basic Input Output System) initiated boot process, a device scan is initiated in step 400, looking for a device BIOS. If no device BIOS is detected, the boot process continues with step 410. The BIOS will initialize all adapters and calls the device BIOS if present in step 406.

The function of the local subsystem access module 100 is to act and behave like a graphics controller by providing bare necessary functionality (step 404). If a graphics controller is detected or an adequate signal is provided by the local subsystem access module 100, in step 406 the detected device BIOS is called. The local subsystem access module 100 initializes a frame buffer, if available (step 408). In step 410 the boot process is continued/completed and the local subsystem access module 100 writes to the frame buffer (step 412). Step 414 represents a handover to the operating system (OS). In step 416 it is checked if a graphics adapter is present. If no, the operating system boot is aborted in step 418. Thus, if no initial code of a graphics controller is detected, the system will not boot.

If a graphics adapter is present, the process continues with step 420, where the local subsystem access module 100 writes to the frame buffer. In step 422 the boot process is continued.

A boot process on a non-PC hardware with e.g. a Linux operating system is described in FIG. 4B. Starting with a global firmware initiated boot process in step 430 a PCI device scan is initiated. In step 432 detected devices are initialized. The local subsystem access module 100 in step 434 acts and behaves like a graphics controller. In step 436, if a frame buffer is present, the frame buffer is opened in step 438. The local subsystem access module 100 initializes the frame buffer/writes to the frame buffer (in case this option is present). The system is handed over to the operating system in step 440. In step 442, as a e.g. Linux operating system scans for PCI devices again, in case no graphics driver is present a graphics device is used as frame buffer and the frame buffer is loaded.

Such boot processes can be supported by the local subsystem access module 100, 100a, 100b in all three embodiments described in FIGS. 1 to 3. In case of an embodiment according to FIG. 1, a response of the local subsystem access module 100 at boot time reasonably should represent the device ID and required proceeding according to the graphics controller remotely coupled to the receptor device 200 used in common by all computer servers 10.

In case both modes described in FIGS. 1 and 3 are required to be supported, the local subsystem access module 100, 100b can provide an implementation of a sequencer engine (see FIG. 5) to perform a dual graphics ID response for representing the remotely used graphics controller and for representing a frame buffer device.

Figure 5:
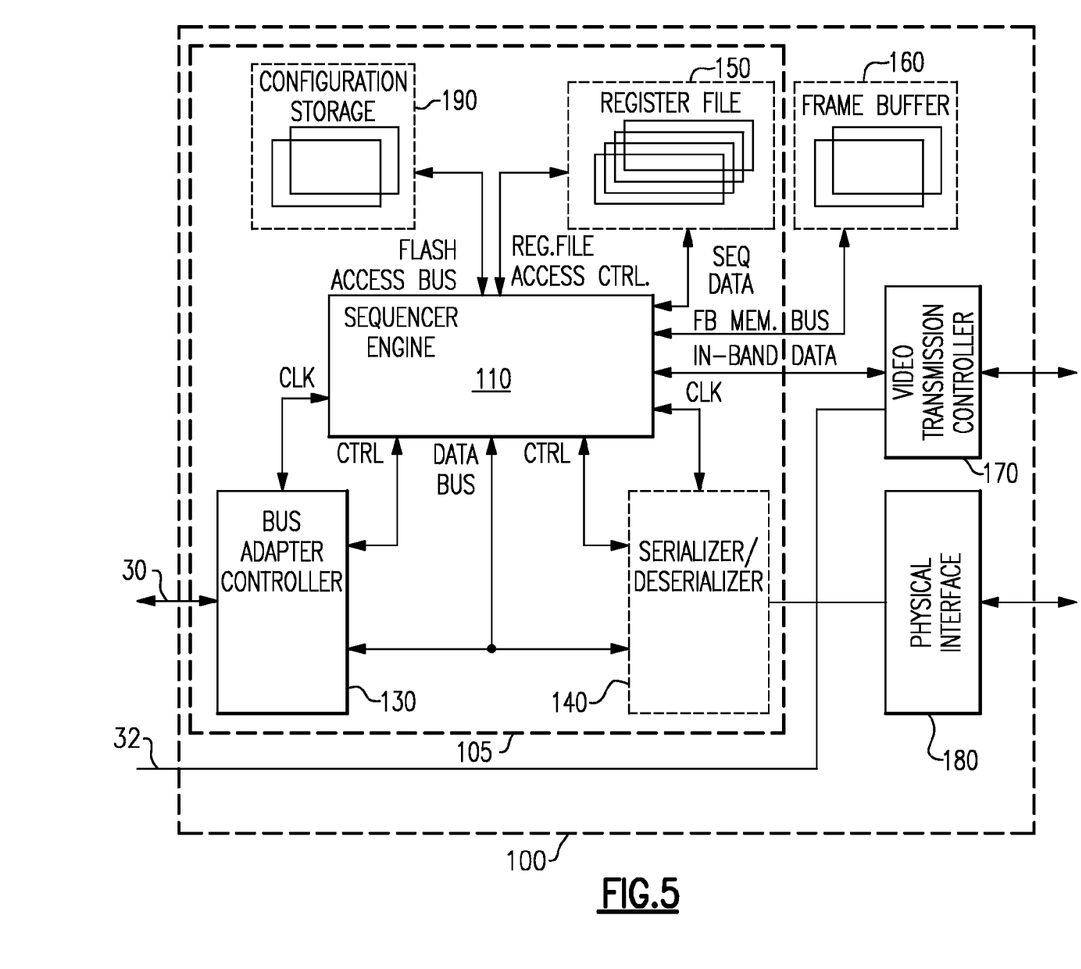
FIG. 5 depicts an embodiment of a preferred local subsystem access module.

A preferred embodiment of a local subsystem access module 100 is depicted in FIG. 5.

A preferred local subsystem access module 100 comprises a sequencer engine 110 which is preferably embodied as a register-file programmable sequencer. The doted line 105 encircles a part of the local subsystem access module 100 which represents a minimum configuration of a local subsystem access module 100, including a configuration storage 190, e.g. a flash memory, an engine register file 150, a system bus adapter controller 130 and—optionally—a serializer/deserializer unit 140, all coupled to the sequencer engine 110, wherein the system bus adapter controller 130 provides access to a system bus 30 for address, data and control. Preferably these components represented by the enclosure 105 (without the optional serializer/deserializer unit 140) can be integrated as a field programmable gate array (FPGA) performing the functions indicated on the individual connections.

The configuration storage 190 is coupled to the sequencer engine 110 through a flash access bus. Between the sequencer engine register file 150 and the sequencer engine 110 register file access control and sequencer data are exchanged. The system bus adapter controller 130 as well as the serializer/deserializer unit 140 each exchange clock and control signals with the sequencer engine 110. A data bus is provided between the system bus adapter controller 130 and the serializer/deserializer unit 140 with the bus also being coupled to the sequencer engine 110. In-band data are exchanged between the in-band video transmission controller 170 and the sequencer engine 110. An input 32 for keyboard and mouse is provided by the in-band transmission controller 170. The frame buffer 160 is coupled to the sequencer engine 110 through a frame buffer bus.

Such a minimum configuration would be sufficient for an application embodied in FIG. 2 in case of e.g. a host in the World-Wide Web without graphics requirement, where the local subsystem access module 100 simulates a graphic controller function for booting purposes only.

The configuration storage 190 preferably includes setup data for the FPGA and the engine register file data, e.g. a sequencer micro code.

The engine register file 150 preferably contains "compare data images" used to direct the sequencer engine 110 to the specific operation sequences. Preferably it also contains data bits to control the serializer/deserializer unit 140. The compare data image can be considered as a set of bit pattern. The sequencer engine 110 uses this bit pattern to compare it against a data pattern received via the system bus adapter. The compare result is fed into the NRFA logic.

The optional serializer/deserializer unit 140 is provided for an embodiment with graphics requirements as depicted in FIG. 1. In this case, the preferred local subsystem access module 100 further provides a physical interface 180, e.g. PCIe or LVDS (low voltage differential serializer), coupled to the serializer/deserializer unit 140. The interface 180 provides access to a video interface bus, e.g. x1PCIe, LVDS or the like.

For a preferred embodiment as described in FIG. 3 depicting a computer server system with remote administration an in-band transmission controller 170 is provided and—optionally—a frame buffer memory 160, e.g. a SDRAM (Synchronous Dynamic Random Access Memory). The frame buffer 160 is reasonably provided in cases where a remote graphics is required for an Ethernet controller. The in-band transmission controller 170 is coupled to the sequencer engine 110 and to an in-band transmission bus (e.g. an MII-bus; MII: Media Independent Interface).

The frame buffer 160 is a read/write memory containing the frame buffer display data. Typically this small memory is a FPGA integrated SRAM (Static RAM), but could also be implemented as DRAM (Dynamic RAM) as well. A recommended size should support 640×480 points with 4 bits, corresponding to 16 colors. On system command the sequencer engine 110 will write data to the frame buffer 160. In concurrence the sequencer engine 110 is performing continuous read cycles incrementally feeding the frame buffer data read to the compression circuit. The compression circuit is not explicitly shown in the block diagram but can be part of register frame buffer output data unit 117 or can be an extra block.

Figure 6:
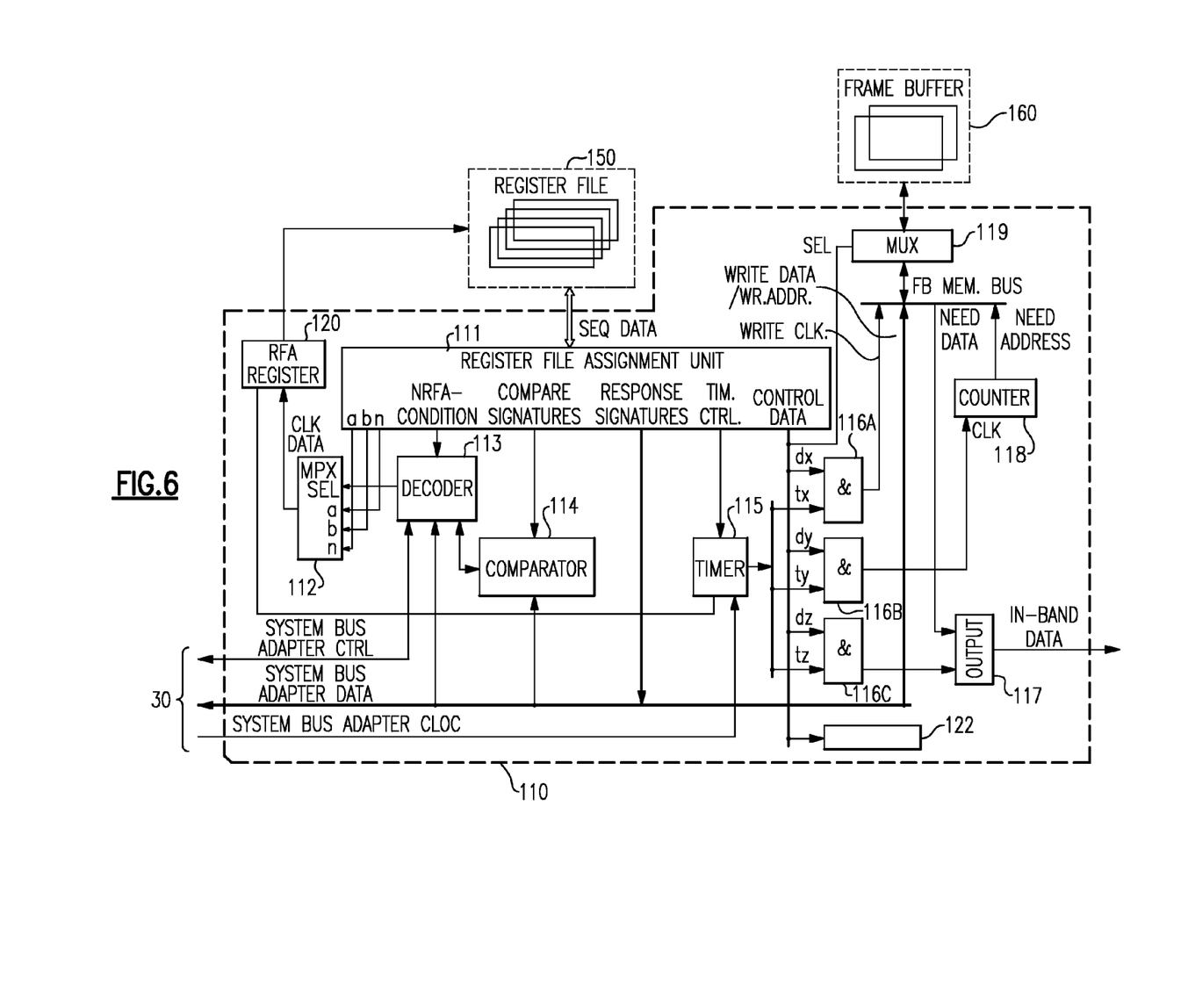
FIG. 6 depicts an embodiment of a preferred engine implemented in the local subsystem access module of FIG. 5.

FIG. 6 shows a detailed block diagram of a preferred sequencer engine 110. The sequencer engine 110 comprises a sequencer engine register-file assignment unit 111 coupled to a sequencer register file assignment (RFA) register 120 through a multiplexer 112. This sequencer RFA register 120 as well as the sequencer engine register-file assignment 111 are coupled to the engine register file 150 providing register file access control and address from the sequencer RFA register 120 and exchanging sequencer data between the sequencer engine register file 150 and the sequencer engine register-file assignment 111. A decoder 113 receives system bus adapter control signals and data for decoding next NRFA condition data. Signatures are compared by a bit level comparator 114 which is also coupled to the system bus adapter data, the decoder 113 and the sequencer engine register-file assignment unit 111. A sequencer timing generator 115 is provided for synchronizing the clock signals of the system bus adapter clock, the timing control of the sequencer engine register-file assignment unit 111 and providing a clock signal for the RFA register 120 and the units 116a, 116b, 116c. The units 116a, 116b, 116c are coupled to a control data port of the sequencer engine register-file assignment unit 111 and to the frame buffer 160 via a frame buffer bus through an address-and-data multiplexer 119 coupled to a frame buffer read address counter 118 arranged between the multiplexer 119 and unit 116b. Unit 116c and the frame buffer bus are connected to a register frame buffer output data unit 117. The units 116a, 116b, 116c are also coupled to the Ethernet serializer/deserializer 122.

The sequencer engine register-file assignment unit 111 can be preferably implemented as a FPGA or a pASIC (Programmable ASIC) or an ASIC (Application Specific Integrated Circuit).

Figure 7:
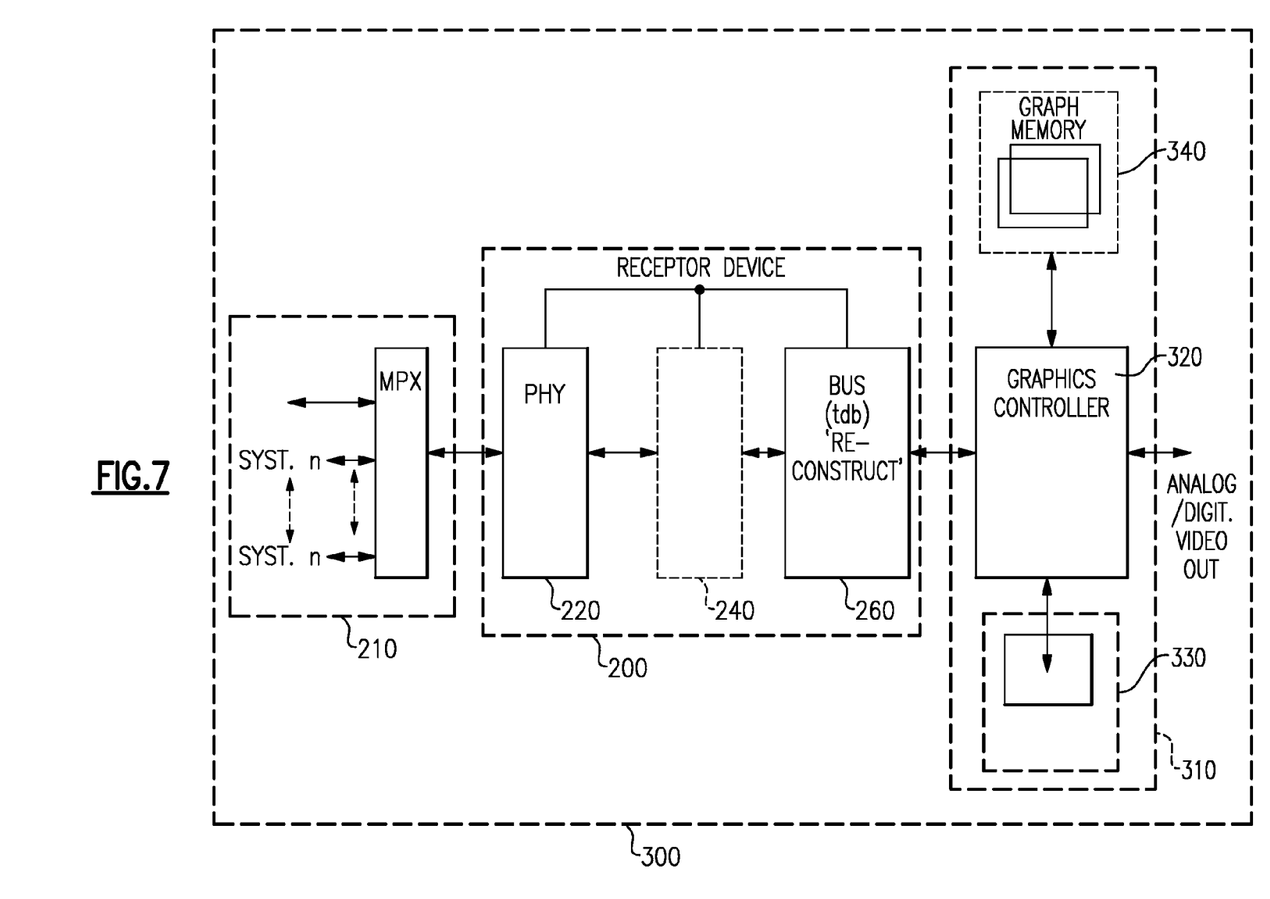
FIG. 7 depicts a preferred receptor device provided for preferred local subsystem access modules.

A block diagram of a preferred receptor device 200 provided for a preferred local subsystem access module embedded in a separate board 300, e.g. a management module of a Blade system (multi-server system back plane/support structure, e.g. Blade mid-plane), is shown in FIG. 7. The local subsystem access module 200 comprises a physical interface 220, a serializer/deserializer 240, e.g. a bus x to 1×PCIe of 1×LVDS, and a bus unit 260 which provides reconstruction of the bus in order to connect the receptor device 200 to one graphics controller subsystem 310 which is common to all local subsystem access modules of the computer server system. The physical interface 220 which receives serial data from the local subsystem access module 100 (FIG. 1) through a multiplexer 210 and the serializer/deserializer 240 receive synchronized control and timing signals from the bus unit 260.

The graphics controller subsystem 310 comprises a graphics controller 320, e.g. a standard graphics chip, an oscillator 330 as a graphics system timing and clock generator and a graphics memory 340, e.g. a DDR (Double-Data Rate) SDRAM. The graphics controller subsystem 310 outputs an analog and/or digital video out.

What is claimed is:
1. A computer server system comprising:
  a computer server of a plurality of computer servers, each computer server comprising a server processing system, the server processing system comprising a local subsystem access module situated on a processing board of the each computer server, the local subsystem access module configured to provide a virtual control function for a single instantiation of a physical hardware resource of the computer server system, the physical hardware resource being shared between the computer server and at least one additional computer server in the plurality of computer servers, wherein the local subsystem access module is communicatively coupled to a first data bus and a second data bus, the first data bus and second data bus being of different formats, the local subsystem access module comprising at least:
a sequencer engine,
a serializer/deserializer, and
a set of register files,
the local subsystem access module configured to perform a method comprising
simulating a physical hardware resource controller during a boot sequence of the each computer server over the first data bus;
receiving a set of physical hardware resource controller data in a first data bus format over the first data bus;
converting the first data bus format to a second data bus format; and
transmitting the set of physical hardware resource controller data in the second data bus format over the second data bus to a receptor device communicatively coupled to the local subsystem access module of each computer server via a multiplexer,
the receptor device configured to perform a method comprising converting the physical hardware resource controller data to one of the first data bus format and a third data bus format.

2. The computer server system of claim 1, wherein the local subsystem access module comprises display control functions and specific subsystem-access ports.

3. The computer server system of claim 1, wherein the first data bus is a serial bus.

4. The computer server system of claim 3, wherein the second data bus is an Ethernet bus that is communicatively coupled to the serial bus.

5. The computer server system of claim 1, wherein the sequencer engine is a register-file programmable sequencer.

6. The computer server system of claim 1, wherein the local subsystem access module comprises a frame-buffer memory.

7. The computer server system of claim 1, wherein the local subsystem access module is integrated in a field programmable gate array.

8. The computer server system of claim 1, wherein the receptor device is common for a plurality of local subsystem access modules in the plurality of computer servers.

9. The computer server system of claim 1, wherein the receptor device is coupled to a plurality of local subsystem access modules in the plurality of computer servers via a multiplexer.

10. A computer server of a computer server system comprising:
a server processing system comprising a local subsystem access module situated on a processing board of the computer server, the local subsystem access module configured to provide a virtual control function for a single instantiation of a physical hardware resource of the computer server system, the physical hardware resource being shared between a plurality of computer servers,
wherein the local subsystem access module is communicatively coupled to a first data bus and a second data bus, the first data bus and second data bus being of different formats, the local subsystem access module comprising at least:
a sequencer engine,
a serializer/deserializer, and
a set of register files,
the local subsystem access module configured to perform a method comprising
simulating a physical hardware resource controller during a boot sequence of the computer server over the first data bus;
receiving a set of physical hardware resource controller data in a first data bus format over the first data bus;
converting the first data bus format to a second data bus format; and
transmitting the set of physical hardware resource controller data in the second data bus format over the second data bus to a receptor device communicatively coupled to the local subsystem access module via a multiplexer,
the receptor device configured to perform a method comprising converting the physical hardware resource controller data to one of the first data bus format and a third data bus format.

11. The computer server of claim 10, wherein the local subsystem access module comprises display control functions and specific subsystem-access ports.

12. The computer server of claim 10, wherein the first data bus is a serial bus is a serial bus.

13. The computer server of claim 12, wherein the second data bus is an Ethernet bus that is communicatively coupled to the serial bus.

14. The computer server of claim 10, wherein the sequencer engine is a register-file programmable sequencer.

15. The computer server of claim 10, wherein the local subsystem access module comprises a frame-buffer memory.

16. The computer server of claim 10, wherein the local subsystem access module is integrated in a field programmable gate array.

17. The computer server of claim 10, wherein the receptor device is common for a plurality of local subsystem access modules in a plurality of computer servers in the computer server system.

18. The computer server of claim 10, wherein the receptor device is coupled to the local subsystem access module of the computer server via a multiplexer.

19. The computer server of claim 18, wherein the receptor device coupled to the local subsystem access module of the computer server via the multiplexer is a single graphics controller subsystem.

20. The computer server of claim 19, wherein the receptor device, the multiplexer, and the graphics controller subsystem are integrated on a common board.

* * * * *